United States Patent
Voorhies et al.

(10) Patent No.: US 7,068,272 B1
(45) Date of Patent: Jun. 27, 2006

(54) SYSTEM, METHOD AND ARTICLE OF MANUFACTURE FOR Z-VALUE AND STENCIL CULLING PRIOR TO RENDERING IN A COMPUTER GRAPHICS PROCESSING PIPELINE

(75) Inventors: Douglas A. Voorhies, Menlo Park, CA (US); James M. Van Dyke, Sunnyvale, CA (US); Jim E. Margeson, III, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1188 days.

(21) Appl. No.: 09/585,810

(22) Filed: May 31, 2000

(51) Int. Cl.
*G06T 17/00* (2006.01)

(52) U.S. Cl. .................................. 345/422
(58) Field of Classification Search ............. 345/418, 345/419, 420, 421, 422
See application file for complete search history.

(56) References Cited

U.S. PATENT DOCUMENTS

| | | | |
|---|---|---|---|
| 4,996,666 A | 2/1991 | Duluk, Jr. ............... | 365/49 |
| 5,535,288 A | 7/1996 | Chen et al. ............. | 382/236 |
| 5,572,634 A | 11/1996 | Duluk, Jr. ............... | 395/119 |
| 5,574,835 A | 11/1996 | Duluk, Jr. et al. ....... | 395/121 |
| 5,596,686 A | 1/1997 | Duluk, Jr. et al. ....... | 395/122 |
| 5,669,010 A | 9/1997 | Duluk, Jr. ............... | 395/800.22 |
| 5,977,987 A | 11/1999 | Duluk, Jr. ............... | 345/441 |
| 6,094,200 A * | 7/2000 | Olsen et al. ............. | 345/422 |
| 6,226,003 B1 * | 5/2001 | Akeley .................... | 345/419 |
| 6,229,553 B1 | 5/2001 | Duluk, Jr. et al. ....... | 345/506 |
| 6,246,415 B1 * | 6/2001 | Grossman et al. ....... | 345/422 |
| 6,268,875 B1 | 7/2001 | Duluk, Jr. et al. ....... | 345/506 |
| 6,285,378 B1 | 9/2001 | Duluk, Jr. ............... | 345/441 |
| 6,288,730 B1 | 9/2001 | Duluk, Jr. et al. ....... | 345/552 |

FOREIGN PATENT DOCUMENTS

| | | |
|---|---|---|
| WO | 93/23816 | 11/1993 |
| WO | 97/05575 | 2/1997 |
| WO | 97/05576 | 2/1997 |
| WO | 00/10372 | 3/2000 |
| WO | 00/11562 | 3/2000 |
| WO | 00/11602 | 3/2000 |
| WO | 00/11603 | 3/2000 |
| WO | 00/11604 | 3/2000 |
| WO | 00/11605 | 3/2000 |
| WO | 00/11607 | 3/2000 |
| WO | 00/11613 | 3/2000 |
| WO | 00/11614 | 3/2000 |
| WO | 00/19377 | 4/2000 |

\* cited by examiner

*Primary Examiner*—Cliff N. Vo
(74) *Attorney, Agent, or Firm*—Silicon Valley IP Group, PC; Kevin J. Zilka

(57) ABSTRACT

A system, method and article of manufacture are provided for early Z-value based culling prior to pixel rendering in a graphics pipeline. In initial stages of processing, Z-value culling is performed on at least one pixel. Thereafter, the pixel is conditionally rendered. Whether the pixel is rendered or not is conditioned on results of the Z-value culling. By culling, or removing, the pixels that do not meet certain criteria prior to rendering, much processing is avoided in the rendering portion of the graphics pipeline.

67 Claims, 10 Drawing Sheets

SYSTEM, METHOD AND ARTICLE OF MANUFACTURE FOR Z-VALUE AND STENCIL CULLING PRIOR TO RENDERING IN A COMPUTER GRAPHICS PROCESSING PIPELINE

FIELD OF THE INVENTION

The present invention relates to computer graphics, and more particularly to occlusion culling during rendering in a computer graphics processing pipeline.

BACKGROUND OF THE INVENTION

During graphics processing, a computer is commonly used to display three-dimensional representations of an object on a two-dimensional display screen. In a typical graphics computer, an object to be rendered is divided into a plurality of graphics primitives. The graphics primitives are basic components of a graphics picture and may be defined by geometry such as a point, line, vector, or polygon, such as a triangle. The graphics primitives are fed through a graphics pipeline where various types of processing occur and then commonly are displayed on an output device.

An example of a typical graphics pipeline 10 is shown in Prior Art FIG. 1 and comprises a transform/lighting unit 12 for converting input primitive data from one coordinate space to another coordinate space, and applying lighting to the transformed graphics primitives. During operation, the transform portion of unit 12 may be used to perform scaling, rotation, and projection of a set of three dimensional vertices from their local or model coordinates to the two dimensional window that will be used to display the rendered object. The lighting portion of unit 12 sets the color and appearance of a vertex based on various lighting schemes, light locations, ambient light levels, materials, and so forth. Thereafter, a rasterizer 14 is utilized to identify the picture elements (pixels) corresponding to each drawn primitive.

Still yet, shading operations 16 are performed to interpolate colors at each of the primitive's pixels and a texture module 18 may perform conventional texture mapping. These may be combined to compute a color for each drawn pixel. The computation required may be complex, requiring expensive arithmetic and consuming considerable bandwidth from texture memory.

Towards the end of the graphics pipeline 10 after shading and texturing, a Z-value of each pixel of a primitive is tested in module 20. Such test includes a comparison of the Z-value of each pixel with a stored Z value which represents the nearest of the preceding primitives that overlapped the pixel. If the compared Z-value is in "front", the color and Z-value are valid and are written. If not, the color and Z-value are not written, and instead discarded. As the speed of processors increase, the tests involving the Z-value of a pixel are performed more and more frequently, and the fraction of color and Z-values that are discarded also increases.

The fact that such prior art processing scheme is computing texture and color values, and then discarding them in such large quantities represents a waste. Various solutions have been set forth in the following publications:

N. Greene, M. Kass, and G. Miller. Hierarchical Z-buffer Visibility. SIGGRAPH proceedings 1993 (pages 231–238).

N. Greene, Hierarchical Polygon Tiling with Coverage Masks. SIGGRAPH proceedings 1996 (pages 65–74).

F. Xie and M. Shantz, Adaptive Hierarchical Visibility in a Tiled Architecture, Proceedings of Eurographics/SIGGRAPH workshop on Graphics Hardware, 1999, pages 75–84.

N. Greene, Occlusion Culling with Optimized Hierarchical Buffer, Visual Proceedings of ACM SIGGRAPH 1999 (page 261).

D. Bartz, M. Meissner, and T. Huttner, Extended Graphics Hardware for Occlusion Queries in OpenGL, Proceedings of Eurographics/SIGGRAPH workshop on Graphics Hardware, 1998, pages 97–104.

While the techniques set forth in the above publications accomplish their intended purposes, they are overly complicated and still render additional occluded pixels unnecessarily. There is thus a need for a way of minimizing unnecessary processing, i.e., reading of various values, and accelerate the rendering of occluded pixels.

DISCLOSURE OF THE INVENTION

A system, method and article of manufacture are provided for early Z-value culling prior to pixel rendering in a graphics pipeline. In initial stages of processing, Z-value culling is performed on at least one pixel. Thereafter, the pixel is conditionally rendered. Whether the pixel is rendered or not is conditioned on results of the Z-value culling. By culling, or removing, the pixels that do not meet certain criteria prior to rendering, much processing is avoided in the rendering portion of the graphics pipeline. This also allows for an accelerated processing rate in the graphics pipeline.

In one embodiment of the present invention, the pixel is rendered with a coarse rasterizer prior to performing the Z-value culling. The coarse rasterization serves to identify which pixels are eligible for Z-value culling. Further, after performing the Z-value culling, such pixel may be rendered with a fine rasterizer which determines exactly which pixels are in the primitive.

In another embodiment of the present invention, the Z-value culling includes reading a stored Z-value associated with the pixel. Next, a test is performed to determine whether the stored Z-value is in front of a primitive Z-value. Results of the test are then used to determine whether or not the pixel is rendered.

The stored Z-value is read from memory such as a register, cache, or a frame buffer. Further, the stored Z-values in the memory may be equipped with a hierarchical structure. In operation, the primitive Z-value at the pixel may be calculated in various ways. For example, the primitive Z-value at the pixel may be calculated based on Z-values of vertexes of the primitive. In the alternative, the primitive Z-value at the pixel may be determined by calculating a nearest Z-value for a group of pixels of the primitive. Still yet, the primitive Z-value at the pixel may be determined by using a Z-value for a vertex of the primitive that is nearest to an eyepoint.

In another embodiment of the present invention, a procedure is provided to handle a situation when the direction of the Z-comparison changes. It should be noted that the aforementioned test which determines whether the stored Z-value is in front of a primitive Z-value operates under the assumption that the Z-value comparison test does not change, insuring that the Z-values change monotonically. If the Z-value comparison test is changed so that the Z-values increase where they were decreasing before (or vice versa), this assumption is no longer valid. In this case, the present invention is adapted to suspend the Z-value culling since any results will be erroneous because they are based on a flawed assumption.

As an option, the Z-value culling may be suspended until pixels preceding the comparison direction change have been processed in the graphics pipeline and have been stored in memory. Whether the pixels preceding the comparison direction change have been processed in the graphics pipeline is determined by injecting a token in the graphics pipeline. Such token is ideally injected after the pixels preceding the comparison direction change. As such, Z-value culling may be resumed upon the token reaching the end of the pipe, indicating that the preceding pixels have been stored in the memory.

In various alternate embodiments of the present invention, the determination as to whether the pixels preceding the comparison direction change have been processed in the graphics pipeline may be carried out using various other methods. For example, a timer may be started upon the direction change, and Z-value culling resumed after a predetermined amount of time. In the alternative, a number of pixels that have been processed may simply be identified. Thus, after a predetermined number of pixels have been processed, Z-value culling may be resumed.

As set forth earlier, the Z-value culling includes reading a stored Z-value. While this stored Z-value is used for early Z-value culling, it may also be used in subsequent tests, i.e. a standard Z-test, as long as it has not changed as preceding pixels pass down the graphics pipeline. In still another embodiment of the present invention, it is determined whether the stored Z-value has changed since performing Z-value culling before rendering the pixel. Next, if it is determined that the stored Z-value has not changed, the Z-value in the graphics pipeline is maintained for use during the standard Z-test. If, however, it is determined that the stored Z-value may have changed, the stored Z-value is read again.

The foregoing determination as to whether the stored Z-value has changed since performing Z-value culling before rendering the pixel may be accomplished using various methods. For example, a timestamp or access sequence numbers associated with reading the stored Z-value may be used. In another alternative, a count of pixel references currently in the pipe can be maintained to identify pixels that are safe to be culled.

In addition to early Z-value culling, similar principles may be employed with respect to early stencil culling in order to further avoid unnecessary processing in the rendering portion of the graphics pipeline. In particular, stencil culling may first be performed on at least one pixel of a primitive. The pixel may then be conditionally rendered after performing the stencil culling. Such rendering is conditioned on results of the stencil culling.

In one embodiment, the stencil culling includes reading a stencil value associated with the pixel. Next, the read stencil value is compared with a stencil reference value. Whether or not the pixel is rendered is conditioned on results of the comparison.

In another aspect of the present alternate embodiment, the stencil culling is suspended when a drawing mode permits a stencil value update. It is then ascertained when pixels rendered using the drawing mode have completed processing. This is accomplished by injecting a token in the graphics pipeline after the cessation of the drawing mode. Upon the token indicating that the preceding pixels have been stored in the memory, stencil culling is resumed.

In various alternate embodiments of the present invention, the determination as to whether the pixels preceding the cessation of stencil value update have been processed in the graphics pipeline may be carried out using various other methods. For example, a timer may be started upon the cessation of stencil value update, and stencil value culling resumed after a predetermined amount of time. In the alternative, a number of pixels that have been processed may simply be identified. Thus, after a predetermined number of pixels have been processed, stencil value culling may be resumed. In another alternative, a count of pixel references currently in the pipe can be maintained to identify pixels that are safe to be culled.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
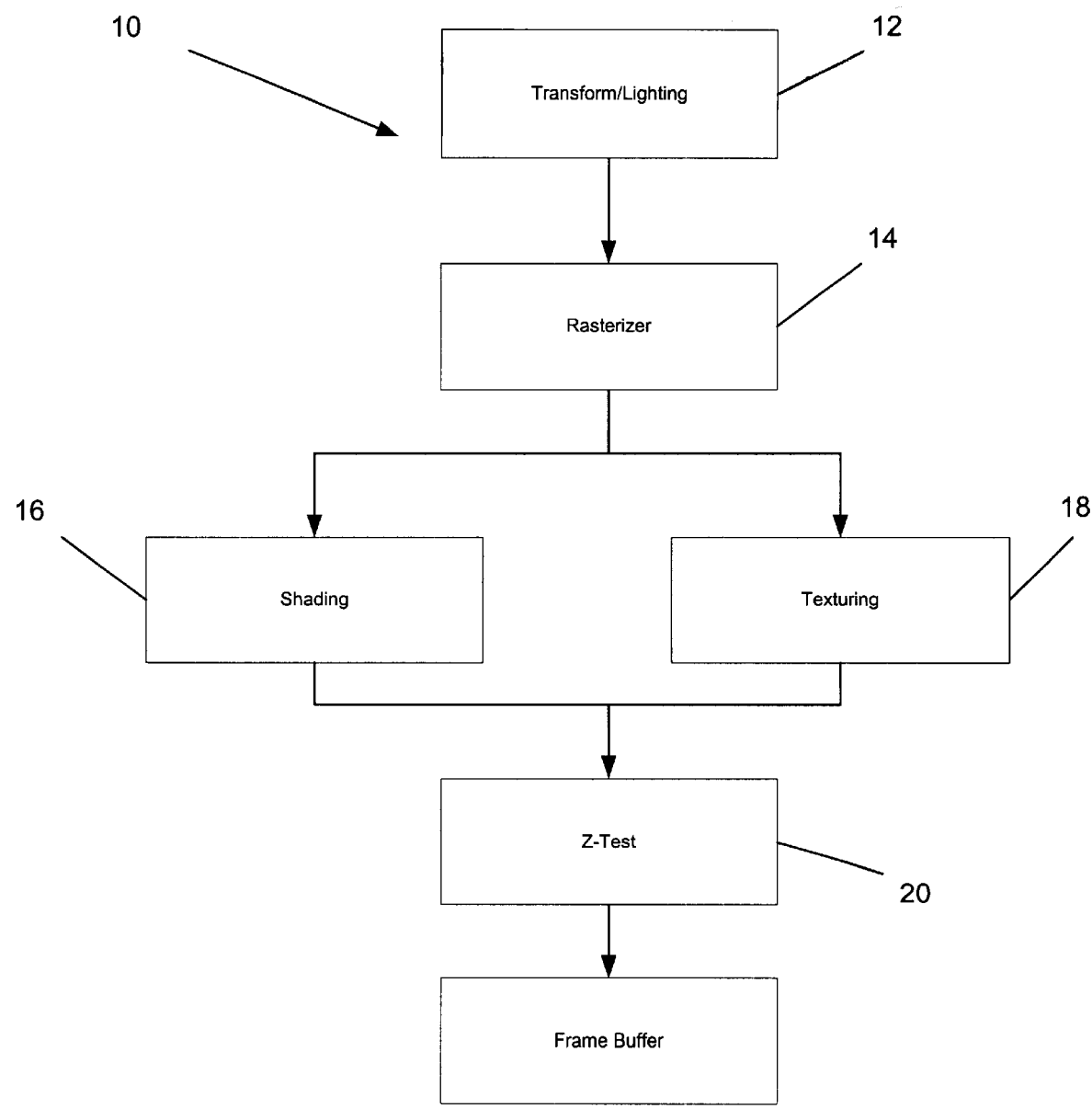
FIG. 1 is a block diagram of a prior art hardware implementation of a computer graphics pipeline.
Figure 2:
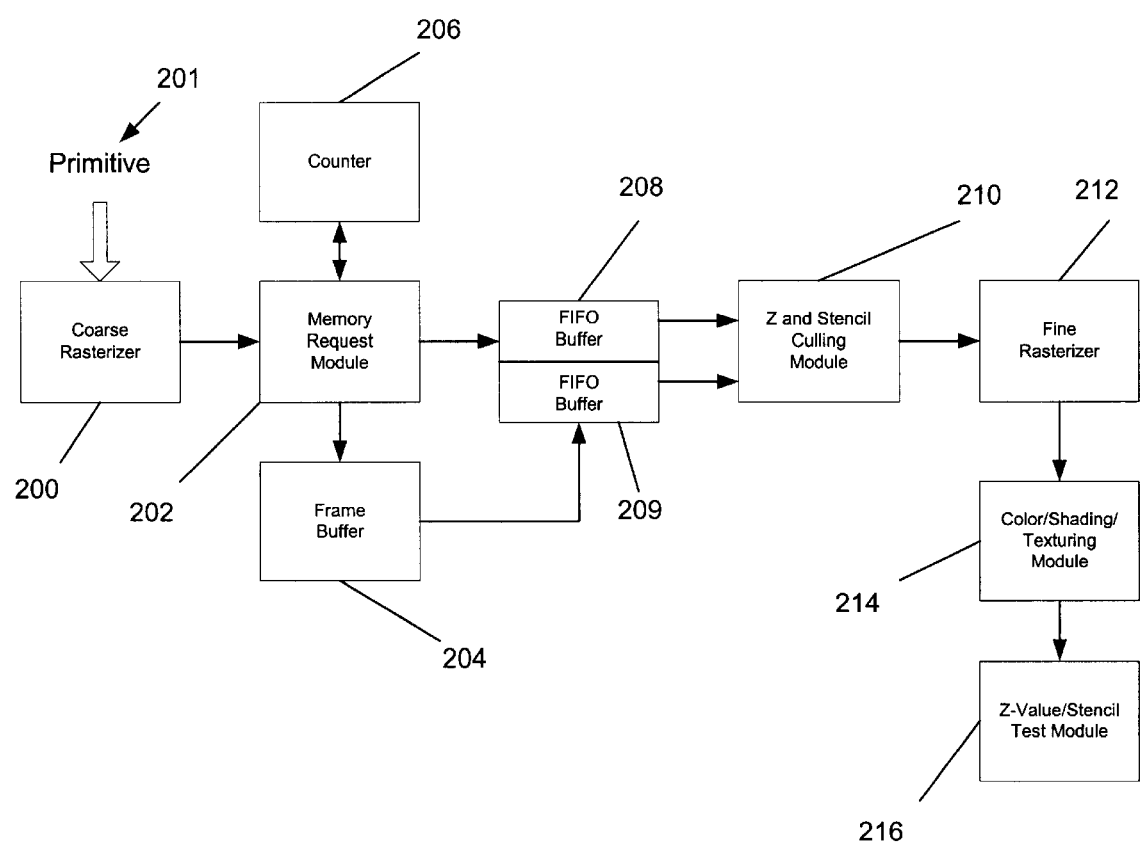
FIG. 2 illustrates one embodiment of a hardware implementation of the present invention.

FIG. 1 illustrates a prior art graphics pipeline. FIG. 2 illustrates one embodiment of a hardware implementation of the present invention. As shown, a coarse rasterizer 200 is provided which is adapted to receive a primitive 201 from a set-up module or the like in a preceding portion of the graphics processing pipeline. In use, the coarse rasterizer 200 is equipped for limited rendering. In particular, the coarse rasterizer 200 serves to identify which pixels are eligible for Z-value culling.

Such limited rendering is accomplished by the coarse rasterizer 200 by providing a n×m patch of pixels naturally aligned in pixel space that at least partially overlaps the primitive 201, thus identifying which pixels are of interest. The n×m "footprint" represents the fetch granularity of pixels returned from a single memory access. To this end, the coarse rasterizer 200 narrows the range of what pixels need to be rendered. For reasons that will soon become apparent, each n×m patch of pixels has a data value (1 bit per pixel) which indicates whether the an pixels may be discarded.

Coupled to the coarse rasterizer 200 is a memory request module 202. The memory request module 202 is coupled to memory 204 such as a register, cache, a frame buffer, or the like. In operation, the memory request module 202 is adapted to receive the patch of pixels from the coarse rasterizer 200, and retrieve pertinent information, i.e. Z-values, stencil value, etc., therefrom. As an option, the memory request module 202 may further be coupled to a counter 206 for timestamping the information retrieved from the memory 204 for reasons that will become apparent hereinafter.

As an option, the information retrieved from memory 204 and the information produced by the coarse rasterizer 200 may be temporarily stored in a first-in first-out (FIFO) buffer. Such buffer is coupled to the memory request module 202 and the memory 204 for accomplishing this. As an option, the information retrieved from memory 204 and the information produced by the coarse rasterizer 200 may be temporarily stored in the first-in first-out (FIFO) buffers 208 and 209, respectively. Buffer 208 may hold the Z and/or stencil data for each pixel, and buffer 209 may hold all other pixel information.

Next in the graphics pipeline is a Z-value culling and stencil-culling module 210 coupled to the buffers 208 and 209. It should be noted that the Z-value culling and stencil culling module 210 may be a unitary module, or separated into multiple modules capable of carrying out Z-value culling and stencil culling. Further, a Z-value culling module may be used without use of a stencil culling module, and vice versa.

In operation, the Z-value culling and stencil culling module 210 determine which of the pixels in the patch of pixels require more comprehensive rendering based on the retrieved Z-values and reference stencil value. By culling, or removing, the pixels that do not meet certain criteria prior to further rendering, much processing is avoided in the rendering portion of the graphics pipeline. This also allows for an accelerated processing rate in the graphics pipeline. The particular manner in which the Z-value culling and stencil culling is performed will be set forth hereinafter in greater detail.

The Z-value culling and stencil culling module 210 is in turn coupled to a fine rasterizer 212 and a color/shading/texturing module 214. The fine rasterizer 212 determines the location of the pixel(s) in the primitive in a manner that is commonly known to those skilled in the art. It should be noted that the fine rasterizer 212 is an optional module that may be done away with per the desires of the user. Further, the color/shading/texturing module 214 colors and adds shading to the pixels also in a manner that is well known to those of ordinary skill in the art.

Coupled to the color/shading/texturing module 214 is a Z-value and stencil value test module 216 that performs operations similar to those of module 210. In particular, the Z-value and stencil value test module 216 performs a test involving the Z-value and stencil value of the pixels for the purpose of determining whether pixels should be discarded.

Figure 3:
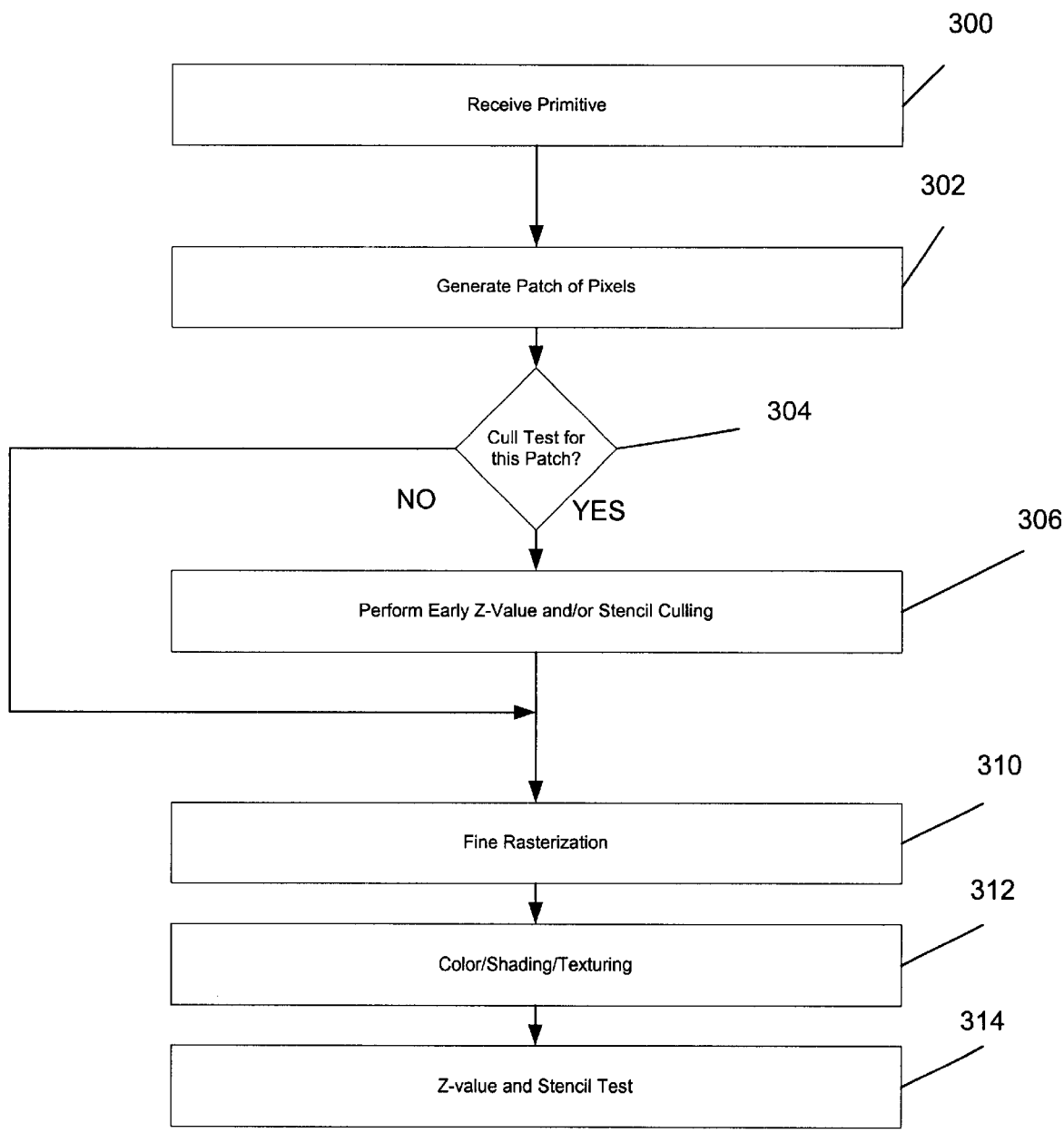
FIG. 3 illustrates a flowchart delineating the various steps carried out by the hardware of FIG. 2 in order to perform early Z-value and stencil culling in accordance with one embodiment of the present invention.

FIG. 3 illustrates a flowchart delineating the various steps carried out by the hardware of FIG. 2 in order to perform early Z-value and stencil culling. As shown, a primitive is received by the coarse rasterizer 200 in operation 300. It should be noted that primitive may take any form including, but not limited to a triangle, quadrilateral, line, etc.

Next, in operation 302, a n×m patch of pixels is generated by the coarse rasterizer 200. Such patch of pixels at least partially overlaps the primitive. It should be noted that any size patch may be employed per the desires of the user. Further, the patch of pixels may include as few as one pixel.

After the patch of pixels is generated, it is decided in decision 304 as to whether it is appropriate to initiate Z-value and/or stencil value culling. If it is determined in decision 304 that Z-value and/or stencil value culling is appropriate, it is performed in operation 306. Details relating to the manner in which Z-value and stencil value culling is performed will be set forth in greater detail during reference to FIG. 4. It should be noted that the decision 304 is based on numerous parameters that may be monitored. In particular, Z-value culling may require some or all the conditions in Table 1 to be true:

TABLE 1

Zcullenable (state bundle bit) - this is an overall control bit for the Zcull mechanism, sent down the pipe between primitives as is most other state information.
Depthtestenable - this is the OpenGL or D3D API bit to enable Z buffering.
Depthfunc != GL_ALWAYS - this is the OpenGL Z buffering comparison function. "ALWAYS" means always pass the test. In this case, one can never reject pixels.
Depthfunc != GL_NOTEQUAL - this is the OpenGL Z buffering comparison function.
A NOT_EQUAL test rejects pixels whose Z-value is exactly equal to that in memory. If the pixel Z-value is not determined precisely at this point in the pipeline, such culling cannot be performed.
StencilpermitsZcull - this variable means that the stenciling mechanism may wish to update the stencil value in this pixel EVEN IF THE Z COMPARISON FAILS. Whenever that is the case, culling is not permitted.
StencilpermitsZcull = Stencildisabled || Stencilwritemask == 0 || Stencilwriteenable == 0 || Stencilzfailop == GL_KEEP
Surface has valid Z - this means there are Z values in the frame buffer for the current pixels.
Surface is tiled - This is a minor limitation of our particular implementation. One may only handle Z values when arranged in "tiles". This complication is unrelated to our invention.
Surface is not swizzled - this is a possible minor limitation of implementation. One may only handle Z values when not scrambled the way texture is often scrambled. This complication may or may not be related.
No Depthfunc direction change (e.g., GL_GREATER --> GL_LESS) flowing down the pipe. A constant comparison direction is essential to make the Z values read "early" be conservative. Previous recent triangles may update the Z values, but they would move Z in a conservative (closer to the eye) direction, and so the comparison is still valid. (If a new triangle is behind the older Z values, they would be even further behind the updated Z values.) But if an application changes the comparison direction, this conservative assumption is not longer true. One must wait until all the pixels handled using the old comparison have gone down the pipe and finished updating Z in their non-conservative way. Then one can resume Z culling.
Polygon Offset disabled - Polygon offset is a function that may alter the triangle's Z values. In one implementation, this alteration may not have happened yet, and so one can not have confidence in the triangle's Z-values. Rather than try to cope, one may just stop Z culling when this function is turned on.
Shader does not change Z - The shader may alter the triangle's Z values. In one implementation, this alteration may have not happened yet, and so one can not have confidence in the triangle's Z-values. Rather than try to cope, one can just stop Z culling when this function is turned on.
NxM tile from Coarse rasterizer has some coverage. (The last NxM in primitive may have no coverage and act just as a vehicle to communicate end-of-primitive bit).
Occasionally one may get a NxM whose pixel_reject mask already indicates that all pixels are rejected. Coarse sends it out anyway if it contains an end-of-primitive bit that is needed to keep everything synchronized. Since all the pixels are already rejected, there is no point in trying to cull them.

TABLE 1-continued

Similarly, stencil culling has lots of conditions too:
Stencilcullenable = This is an overall control bit for the Stencil cull mechanism, sent down the pipe between primitives as is most other state.
Stenciling Enabled - This is the OpenGL or D3D API bit to enable stenciling.
Stencilfunc != GL_ALWAYS - This is the OpenGL stencilcomparison function. "ALWAYS" means always pass the test. In this case, one can never reject pixels.
Surface has valid Z - This means there are Z and stencil values in the frame buffer for the current pixels.
Surface is tiled - This is a minor limitation of our particular implementation . . . one may only handle Z/stencil values when arranged in "tiles". This complication may or may not be pertinent.
Surface is not swizzled - This is a minor limitation of one possible implementation. One may only handle Z/stencil values when not scrambled the way texture is often scrambled. This complication may or may not be pertinent.
Surface has 32-bit Z/Stencil - When the Z format is 16-bit Z, the frame buffer contains no stencil values. Only with 24-bit Z does one have room for 8 bits of stencil.
Stencil operation does not permit stencil field update.
If either the stencil write mask is zero or writing is disabled or the operation prohibits stencil update, one may infer that the stencil values will not be updated (given this current state). If the stencil values could be written at any time, one cannot trust what information read from the frame buffer.
No stencil-updating state flowing down the pipe - This is the same as the previous condition, except it is determined by the state flowing down the pipe ahead of the current pixels. One can only do stencil culling if the current state says "no update" and if all of the pixels currently in the pipe say "no update" also.

In one embodiment of the present invention, a procedure is provided to handle a situation when the direction of the primitive Z-value changes. It should be noted that the aforementioned test which determines whether the stored Z-value is in front of a primitive Z-value operates under the assumption that Z-values in front have a greater value, or vice versa, depending on protocol with which the graphics pipeline is programmed. When this assumption is no longer valid or, in other words, the direction changes, the present invention is adapted to suspend the Z-value culling since any results will be erroneous because they are based on a flawed assumption.

The Z-value culling may be suspended until pixels preceding the comparison direction change have been processed in the graphics pipeline and have been stored in memory. The reason for this is that one must wait until all the pixels handled using the previous comparison protocol have gone down the pipe and finished updating Z-values. Whether the pixels preceding the comparison direction change have been processed in the graphics pipeline is determined by injecting a token in the graphics pipeline. Such token is ideally injected after the pixels preceding the comparison direction change. As such, Z-value culling may be resumed upon the token indicating that the preceding pixels have been stored in the memory.

In various alternate embodiments of the present invention, the determination as to whether the pixels preceding the comparison direction change have been processed in the graphics pipeline may be carried out using various other methods. For example, a timer may be started upon the direction change, and Z-value culling resumed after a predetermined amount of time. In the alternative, a number of pixels that have been processed may simply be identified. Thus, after a predetermined number of pixels have been processed, Z-value culling may be resumed.

As mentioned earlier, if it is determined in decision 304 that Z-value and/or stencil culling is appropriate, such is performed in operation 306. A stencil is a small number included with each pixel, which can be updated and/or tested during pixel drawing. It permits selective update of pixels based on preceding drawing operations, for example to mask off rendering outside of a circle corresponding to a ship's porthole.

In operation 306, the stencil culling includes reading a stencil value associated with the pixel. Such stencil value is commonly included with other conventional data accompanying the pixel. In one embodiment, the stencil value may include one or more bits which indicate which pixels are affected by drawing. For example, each pixel may have a bit which indicates that the pixel should be drawn by being set as "1", and indicate that the pixel should not be drawn by being set as "0".

Next, the read stencil value is compared with a stencil reference value. Such stencil reference value is a small number (1–8 bits) that is defined by OpenGL and D3D to be part of the current rendering state. Subsequently, in operation 310, the fine rasterization is carried out by the fine rasterizer 212 based on results of the Z-value and stencil culling.

In another aspect of the present invention, the stencil culling may be suspended when a drawing mode permits a stencil value update. A stencil value update refers to the current rendering state permitting stencil values in memory to be altered. It is then ascertained when pixels rendered using the drawing mode have completed processing. This is accomplished by injecting a token in the graphics pipeline after the cessation of the drawing mode. Upon the token reaching the point near the end of the pipeline where pixels are written to memory, stencil culling is resumed. Primitives drawn when the rendering state permits stencil update thus cause the suspension of stencil culling until the possibility of an update has past.

In operation 312, color/shading/texturing is performed by the color/shading/texturing module 214 on any pixels that survive the Z-value and stencil culling. Thereafter, the Z-value and stencil value test module 216 performs the Z-value and stencil test.

Figure 4:
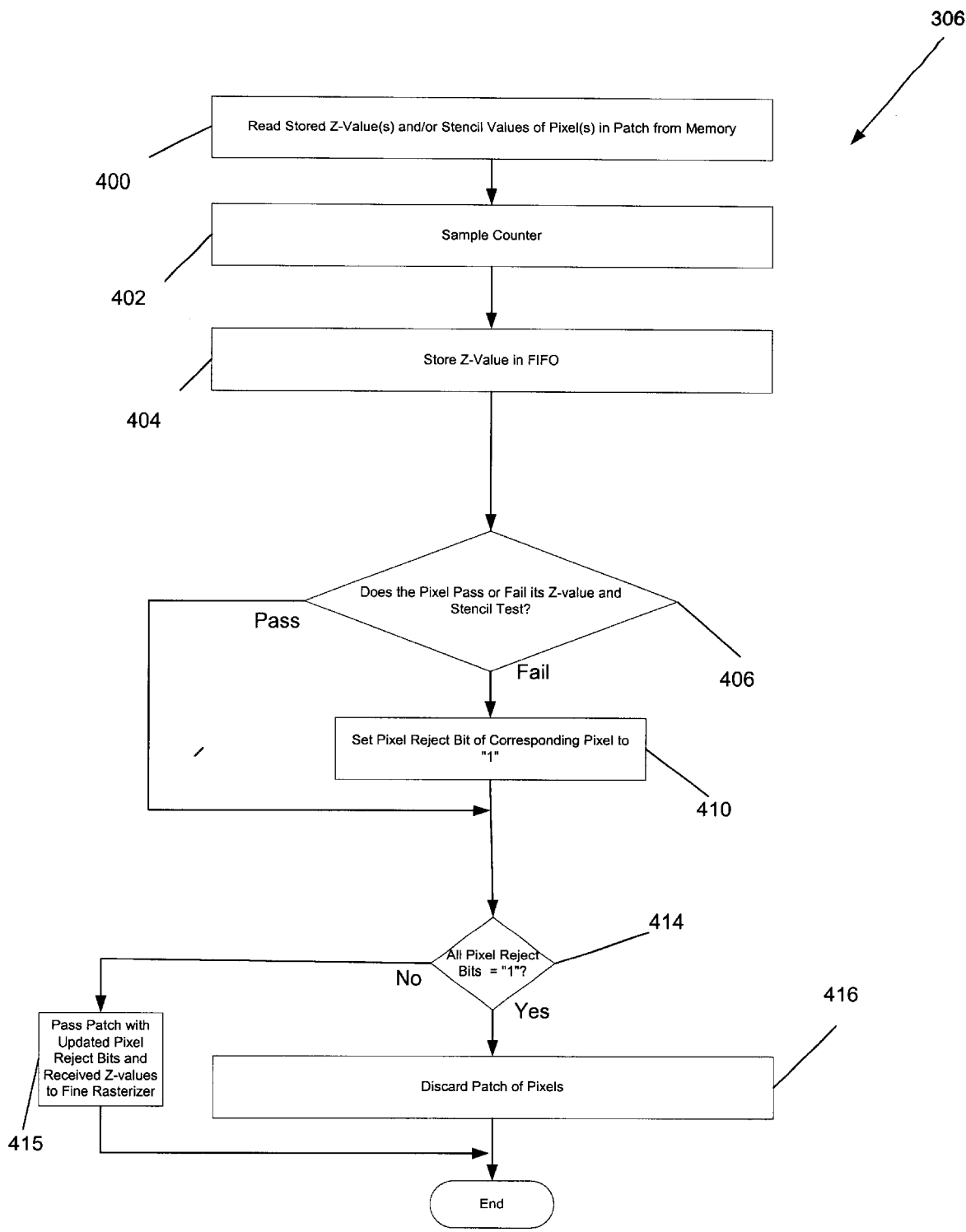
FIG. 4 illustrates a flowchart delineating the steps associated with performing early Z-value culling as set forth in operation 306 of FIG. 3 in accordance with one embodiment of the present invention.

FIG. 4 illustrates a flowchart delineating the steps associated with performing early Z-value culling in accordance with operation 306 of FIG. 3. As shown, a stored Z-value(s) and/or stencil value(s) associated with the pixel(s) are read from the memory 204 in operation 400. This may be carried out by the memory request module 202 by determining an x and y coordinate associated with each pixel, and requesting from memory 204 a Z-value for each of the pixels using the x and y coordinates.

Next, in operation 402, the counter 206 is sampled in order to stamp the stored Z-value with a current time or sequence number. As will become apparent, such timestamp is used to determine the validity of the stored Z-value as the processing progresses in the graphics pipeline. As an option, the Z-value may be stored in the buffer 210 in order to accommodate slower processors, etc.

In operation 406, a test is performed by the Z-value and stencil culling module 210 to determine whether the stored Z-value is in front of a primitive Z-value. Results of the test are then used to determine whether or not the pixel is rendered. It should be noted that the nearest vertex Z-value may be a largest or smallest value depending on the processing protocol. As a safe approximation of the Z-values within the primitive, the nearest of the vertex Z-values can be used in all the primitive's Z-culling comparisons.

In particular, if it is determined in decision 406 that the stored Z-value is behind the primitive Z-value, no culling may be done. On the other hand, if it is determined in decision 406 that the stored Z-value is in front of the primitive Z-value, the pixel reject bit associated with the pixel is turned on, or set to "1". See operation 410.

The stored Z-values in the memory may take various forms. For example, the stored Z-values may be equipped with a hierarchical structure that includes additional storage holding a limit value summarizing the most extreme value found in a patch of memory. This value may be approximate and may be updated infrequently. Alternatively, non-hierarchical stored Z-values as accessed may be themselves be approximate.

Further, the primitive Z-value at the pixel may be calculated in various ways. For example, the primitive Z-value at the pixel may be calculated based on Z-values of vertexes of the primitive using interpolation or extrapolation. In the alternative, the primitive Z-value at the pixel may be determined by calculating a nearest Z-value for a group of pixels of the primitive. Still yet, the primitive Z-value at the pixel may be determined by using a Z-value for a vertex of the primitive that is nearest to an eyepoint.

Once all of the Z-values have been tested, it is determined in decision 414 whether all of the pixel reject bits of the pixels of the patch are set to "1". If so, the patch of pixels is discarded in operation 416 since each of the pixels is in front of the primitive Z-value. This avoids unnecessary processing by the fine rasterizer 212 and color/shading/texturing module 214. If, on the other hand, at least one of the pixel reject bits remains at "0", then the patch of pixels proceeds to the fine rasterizer. The fine rasterizer may determine some or all of the pixels are outside of the primitive and thus turn on additional pixel reject bits. Pixels whose reject bits still remain at "0" are passed to the color/texturing/shading unit for processing.

Figure 5:
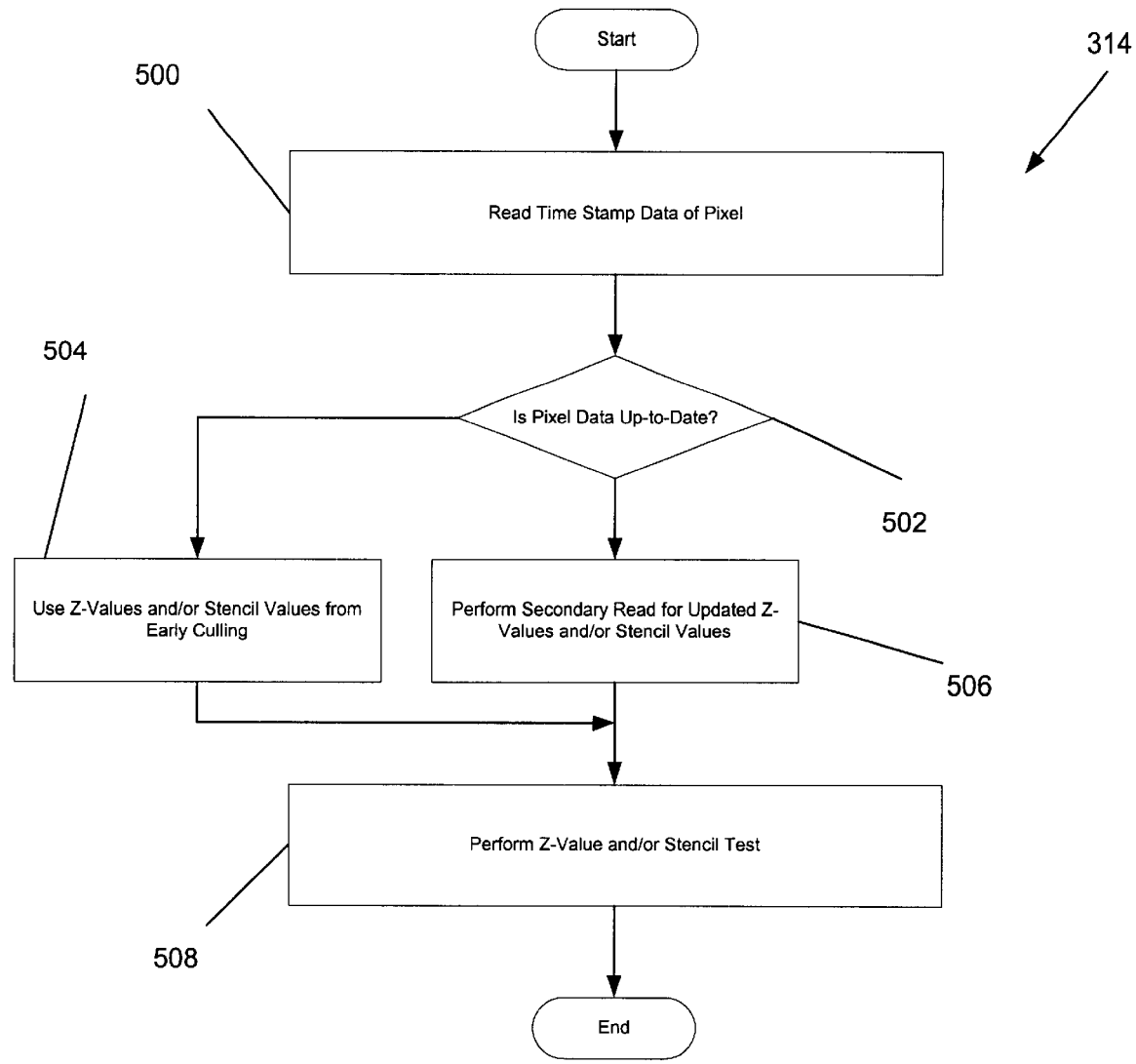
FIG. 5 illustrates a flowchart delineating the steps associated with performing the Z-test as set forth in operation 314 of FIG. 3 in accordance with one embodiment of the present invention.

FIG. 5 illustrates a flowchart delineating the steps associated with performing the Z-test in accordance with operation 314 of FIG. 3. As set forth earlier, the Z-value culling includes reading a stored Z-value. While this stored Z-value is used for early Z-value culling, it may also be used in subsequent tests, i.e. a standard Z-test, as long as the stored value has not changed as processing progresses down the graphics pipeline. As pixels are processed in the pipeline, there is always a chance that the Z-values may be updated by preceding pixels. Such updates, however, normally bring the Z-values closer to the eye. The present invention is thus conservative during the culling decision, and is not normally affected by such changes. In a few cases, however, the Z-values passed down the pipe for use in the final Z-test may be made obsolete.

In operation 500, a timestamp associated with the stored Z-value of each pixel is read. It is then determined in decision 502 whether the stored Z-value has changed since performing Z-value and stencil value culling before rendering the pixel. If it is determined in decision 502 that the stored Z-value and/or stencil value has not changed, the stored Z-value and/or stencil value in the graphics pipeline is maintained in operation 504. In other words, the stored Z-value and/or stencil value used during early culling is used for the final operation 508. On the other hand, if it is determined that the stored Z-value and/or stencil value may have changed, the stored Z-value and/or stencil value is read again in operation 506. While a timestamp may be used to determine the validity of the stored Z-value associated with the pixel, other methods may also be employed. For example, access sequence numbers associated with reading the stored Z-value, X and Y coordinates associated with reading the stored Z-value, or pixel reference counts for pixels in the pipeline may be utilized.

In another alternative, a count of pixel references currently in the pipe can be maintained to identify pixels that are safe to be culled. In such embodiment, a count may be maintained for every pixel in terms of how many references to it are currently flowing down the graphics pipeline. When the rasterizer indicates that a triangle overlaps a pixel, an associated reference count may increment. When the pixel is rejected (early) or rendered (late), the associated reference count may decrement. Given such a data structure, the same may be inspected when beginning to process a pixel. If the associated reference count is zero, meaning this is the only reference to this pixel currently in the pipe, then the stored Z/stencil values that are read early may still be the same later. If there are other references to this pixel (count non-zero), then there is a good chance that the stored Z/stencil values we read early will be obsolete later. The present technique differs from timestamps since the test is done at the time of the first read, not necessarily at the far end of the pipe when the final Z-test is executed.

Figure 6:
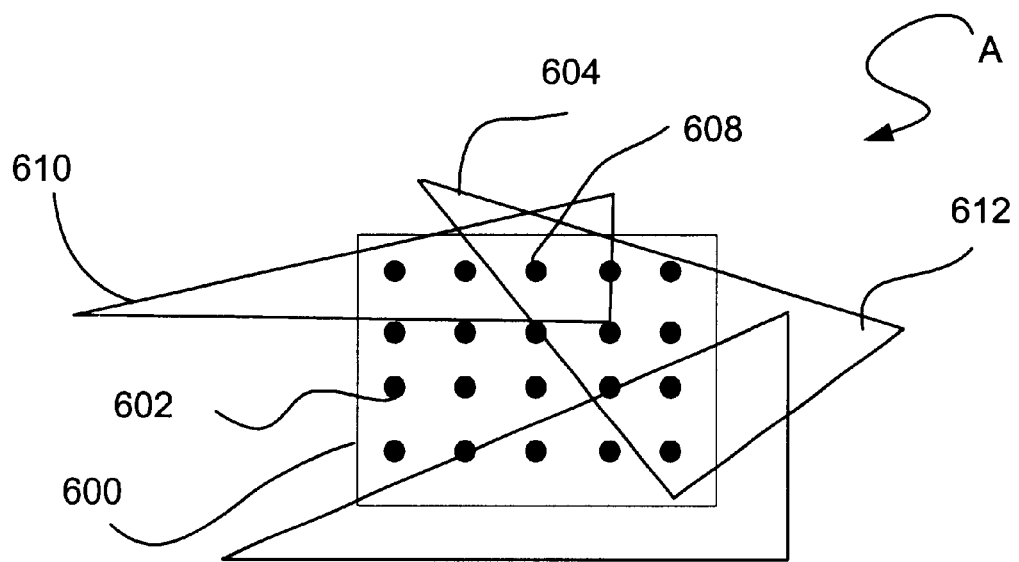
FIG. 6 shows how patches of pixels overlap primitives which, in turn, may or may not overlap each other.
Figure 6:
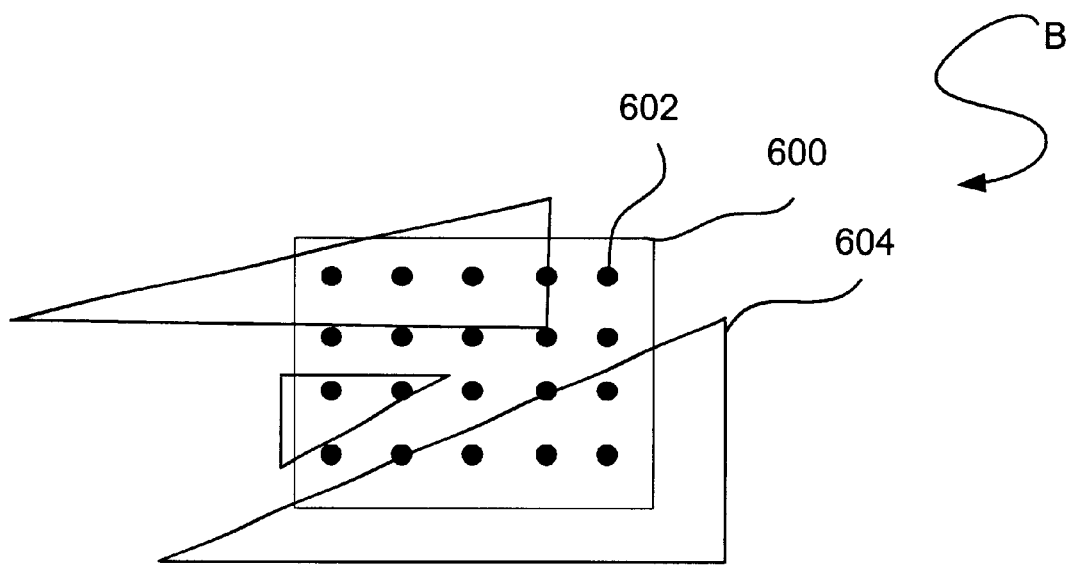

FIG. 6 shows how a patch 600 of pixels 602 may overlap primitives 604, wherein the primitives 604 may or may not overlap each other. Thus, the pixels 602 of the patch 600 may be the subject of processing more than once based on how many primitives 604 are overlapped by the pixel 602, or they may not be subject to processing at all.

As shown in situation A, the pixel 608 may be processed twice, once in association with a first primitive 610 and again in association with a second subsequent primitive 612. In such situation, it is important to perform extra measures which ensure that the most current and updated Z-value is read from and written to the frame buffer. In situation B where the pixels are subject to the processing associated with only one primitive, it would be a waste of resources to execute such extra measures. An embodiment will now be set forth which deals with these situations effectively by performing early Z-value culling on a conditional basis in order to ensure that a Z-value is not read if it will collide with an operation that is pending in the pipeline.

Figure 7:
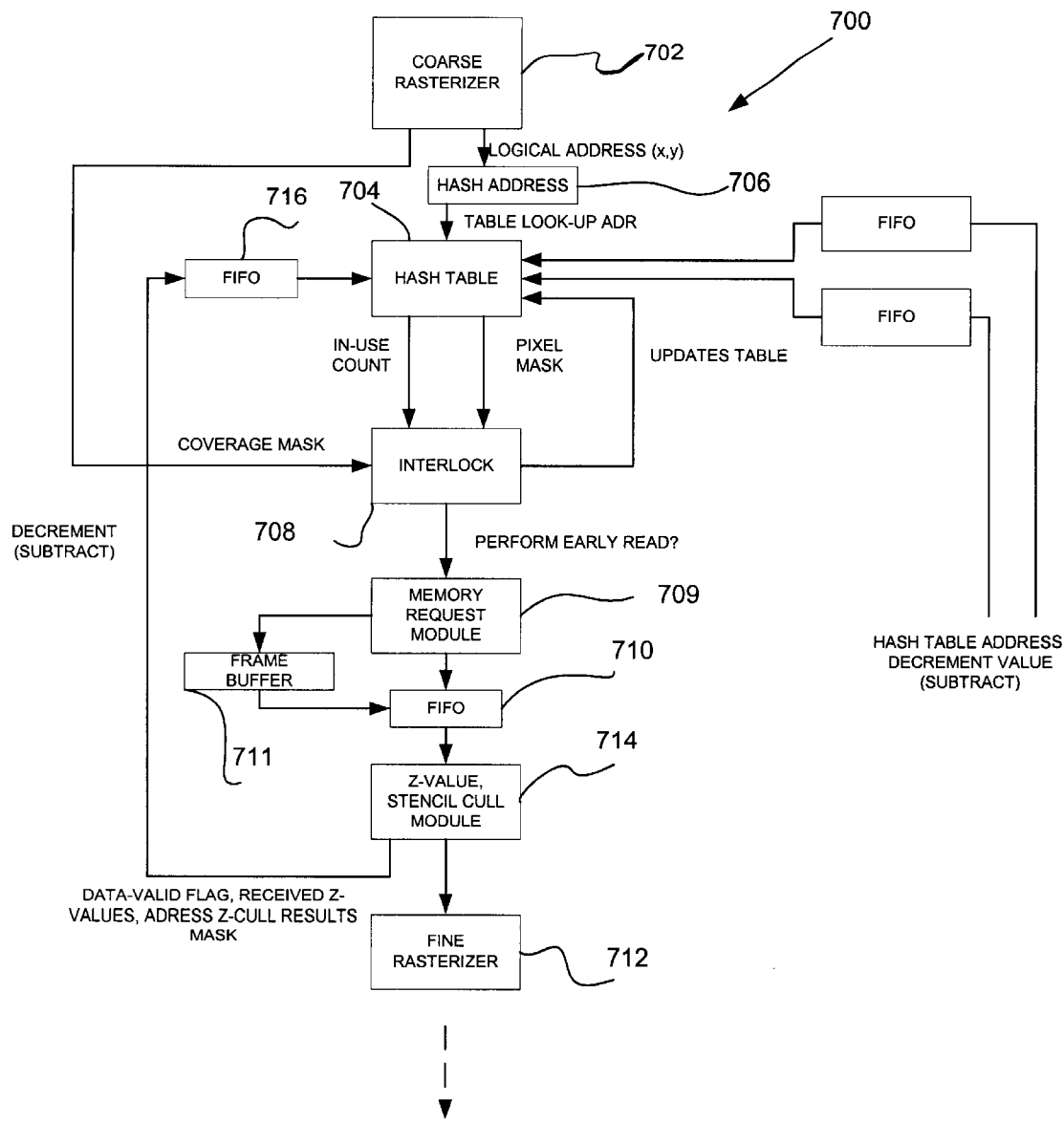
FIG. 7 is a schematic diagram depicting an alternate architecture that may be used to deal with the situations set forth during reference to FIG. 6.

FIG. 7 is a schematic diagram 700 depicting an alternate architecture that may be used to deal with the situations set forth during reference to FIG. 6. Such architecture is similar to that shown in FIG. 2 with the exception of an interlock module and additional variables that ensure the Z-value culling process is only performed on pixels that are not currently being processed in the graphics pipeline.

Figure 7A:
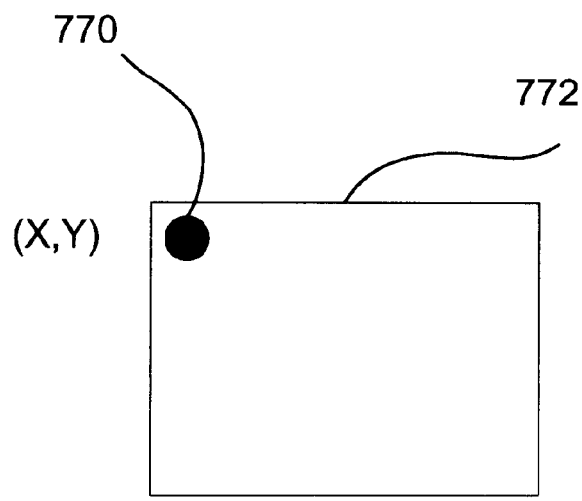
FIG. 7A illustrates that the local address refers to an address of an upper left hand pixel of the patch in accordance with one embodiment of the present invention.
Figure 7B:
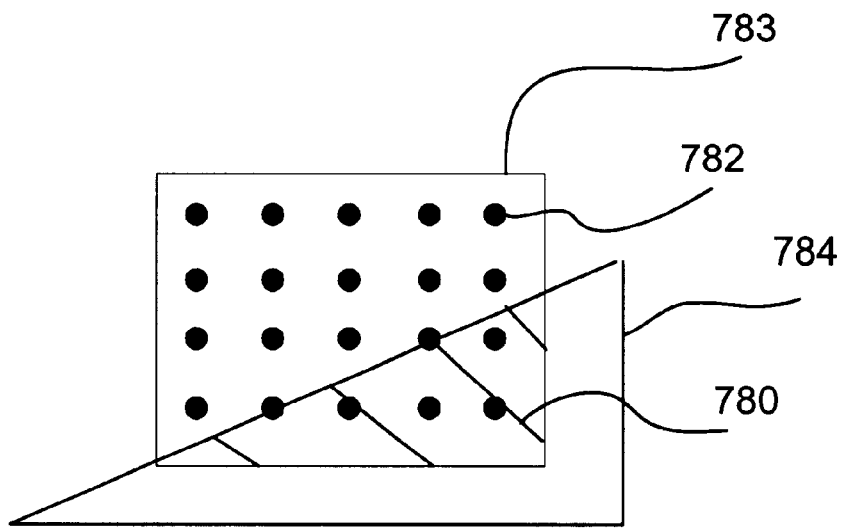
FIG. 7B illustrates an exemplary coverage mask in accordance with one embodiment of the present invention.

As shown in FIG. 7, a coarse rasterizer 702 is included for generating the patch of pixels. Coupled to the coarse rasterizer 702 is a hash table 704. In use, a local address (x,y) generated by the coarse rasterizer 702 is used in conjunction with a hash address 706 for generating a table look-up address. FIG. 7A illustrates that the local address refers to an address of an upper left hand pixel 770, or any other predetermined pixel, of the patch 772. The coarse rasterizer 702 further produces a coverage mask. FIG. 7B illustrates an exemplary coverage mask 780. As shown, the coverage mask 780 identifies which pixels 782 of the patch 783 overlap a primitive 784 that is currently received.

Collisions among different patch addresses that map to the same hash table look-up address are conservative in that they only falsely prevent early Z-value and stencil value culling. Therefore, using the hash table in the interlock is robust.

Based on the table look-up address, an in-use count variable and a pixel mask is retrieved from the hash table

704. Similar to the coverage mask 780 of FIG. 7B, the pixel mask identifies which pixels of the patch overlap a primitive. The difference between the masks is that the pixel mask identifies which pixels of the patch overlap a primitive currently in the pipeline architecture 700. The in-use count variable is used to indicate how many patches of the pixels 782 identified by the pixel mask 780 are currently the subject of processing in the pipeline architecture 700.

The in-use count variable and pixel mask are sent to an interlock module 708 which makes the decision whether the early Z-culling should be performed. This is accomplished by comparing the coverage mask 780 and the pixel mask, and further using the in-use count variable in a manner which will be set forth in detail during reference to FIGS. 8A and 8B. It should be noted that the interlock module 708 also updates the pixel mask information in the hash table 704 during use. Coupled to the interlock module 708 is memory request module 709, FIFO 710, frame buffer 711, and fine rasterizer 712 which are similar to those set forth during reference to FIG. 2.

Also included is a Z-value and stencil culling module 714 which operates in a manner similar to that set forth earlier with the exception of additional functions, namely updating the in-use count variable. Such update is preferably stored in FIFO 716 in order to store the decrements until they can be incorporated into the interlock module 708 during use. In addition to updating the in-use count variable, the Z-value and stencil culling module 714 sets a data-valid flag which indicates whether a late Z-value read and test is necessary.

Figure 8A:
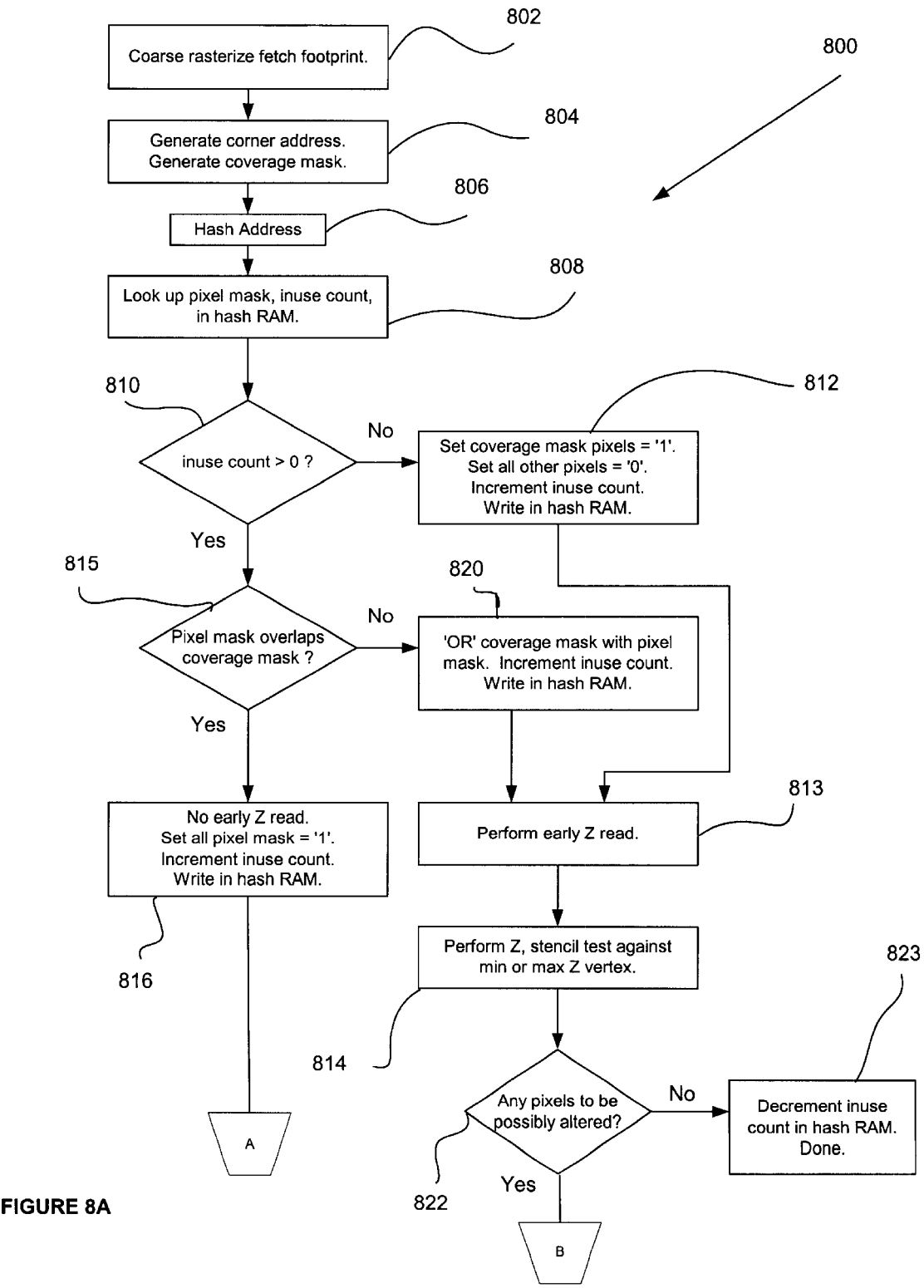
FIGS. 8A and 8B illustrate a flowchart delineating the process associated with the pipeline architecture of FIG. 7 in accordance with an alternate embodiment of the present invention.
Figure 8B:
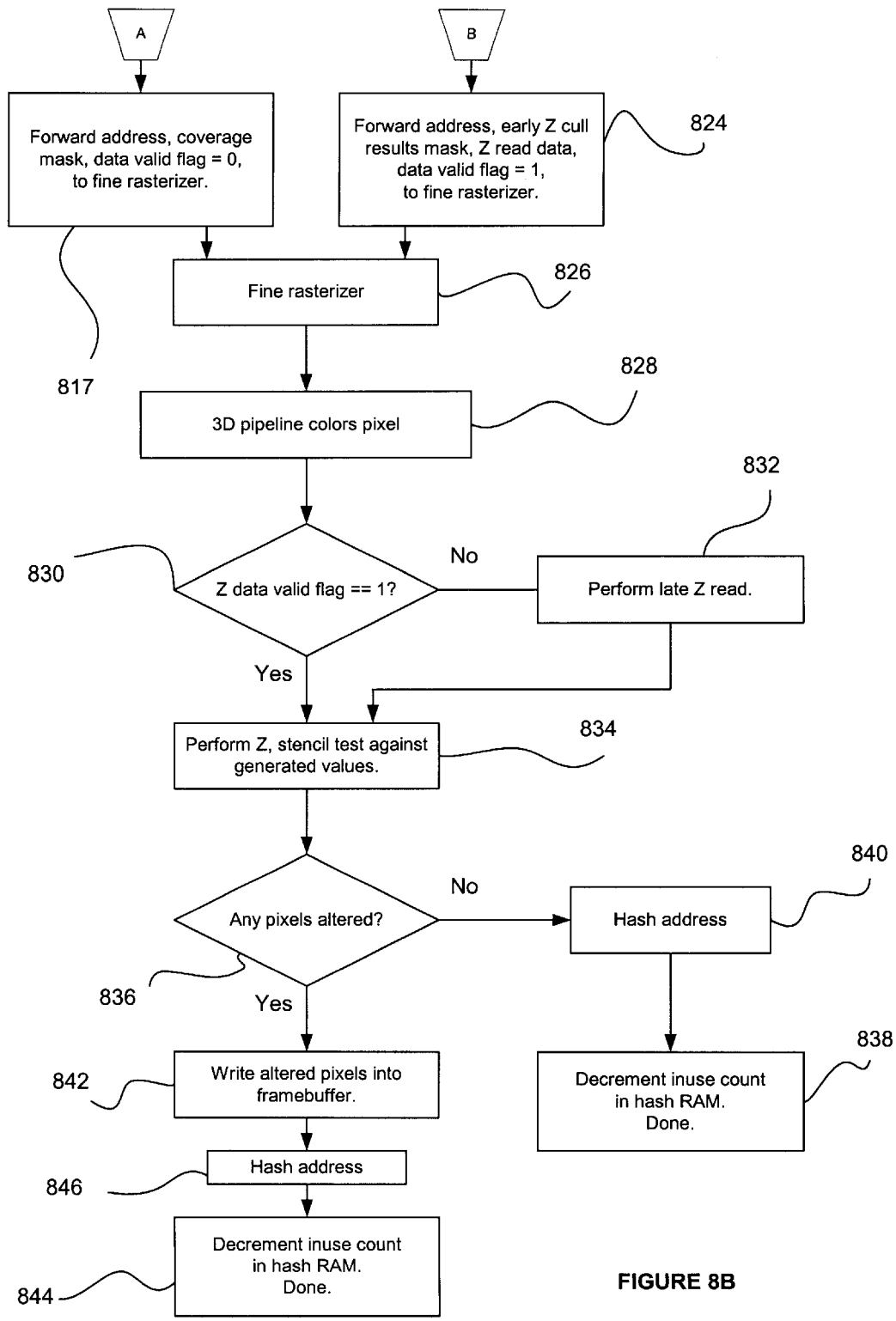

FIGS. 8A and 8B illustrate a flowchart delineating the process 800 associated with the pipeline architecture 700 in accordance with an alternate embodiment of the present invention. It should be noted that such process 800 may be positioned in place of operations of FIG. 3. Initially, the patch of pixels, or "footprint," is fetched from the coarse rasterizer in operation 802. Thereafter, in operation 804, the local address of the patch of pixel is identified, and a coverage mask is generated. As set forth earlier, the coverage mask identifies which pixels of the patch overlap a primitive that is currently received. Note FIG. 7B.

The hash address is subsequently used in operation 806 in order to look up a pixel mask and the status of the in-use count variable in operation 808. It should be noted that the in-use count variable indicates that subject pixels are currently within the pipeline architecture if greater than "0." During use, the in-use variable is incremented and decremented as the subject pixels are processed in and out of the pipeline architecture, respectively.

With continuing reference to FIG. 8A, it is determined whether the in-use variable is greater than "0" in decision 810. If not, it is evident that no pixels of the associated patch are currently the subject of processing in the pipeline. As such, the pixels of the coverage mask are set to "1" (Note FIG. 7B) and all pixels of the patch outside of the coverage mask are set to "0." Note operation 812. Also during such operation, the in-use variable is incremented and stored with the new pixel mask in the hash table. It is then that the early Z-value read occurs in operation 813 followed by the Z-value and stencil culling in operation 814 in accordance with the process of FIG. 4.

If it is determined that the in-use variable is greater than "0" in decision 810, it is further decided in decision 815 whether the pixel mask overlaps the coverage mask. In order for there to be overlap, each mask must "cover" common pixels. As set forth earlier during reference to FIG. 6A, the difference between the pixel and coverage mask is that the pixel mask identifies which pixels of the patch overlap a primitive currently in the pipeline architecture, while the coverage mask identifies which pixels of the patch overlap an incoming primitive.

If it is determined that the pixel mask does overlap the coverage mask, no early Z-culling is performed since that would mean that pixels would be processed in association with more than one primitive, thus contributing to the problem set forth in FIG. 6. Instead of early Z-culling, all of the pixels of the pixel mask are set to "1" (Note FIG. 7B) and the in-use variable is incremented and stored with the new pixel mask in the hash table. Note operation 816. Further, the local address and coverage mask are sent to the fine rasterizer and coloring module in operation 817. Also during such operation, the data valid flag is set to "0." This ultimately ensures that the Z-values are read later for the late Z-value and stencil test, since the early Z-value culling operation was not performed.

If it is determined that the pixel mask does not overlap the coverage mask in decision 815, the coverage mask is OR-ed with the pixel mask in operation 820, thus identifying pixels overlapping either mask. Further, the in-use variable is incremented and stored with the new pixel mask in the hash table. Then, the early Z-value read occurs in operation 813 followed by the Z-value and stencil culling in operation 814 in accordance with the process of FIG. 4. It should be noted that the OR function of operation 820 and the functions associated with operation 812 ensure that no redundant or unnecessary reads are performed, thus reducing resource utilization.

Thereafter, it is determined in decision 822 whether any pixels are to be possibly altered by the fine rasterizer, color/shading module, etc. If not, the in-use variable is decremented and stored in the hash table in operation 823. If so, the local address, read Z-values, and coverage mask information are sent to the conventional fine rasterizer and coloring/shading module in operation 824. Further, the data valid flag is set to "1." This ultimately indicates that the Z-values need not be read later for the Z-value and stencil test since the early Z-value read and culling operations were already performed.

After operation 817 or 824, the fine rasterizer and color/shading module perform their standard functions in operations 826 and 828, respectively. Subsequently, it is determined in decision 830 whether the data valid flag is "1" indicating whether or not the Z-values associated with the processed pixels need to be read by the memory module. If so, the late Z-value read is performed in operation 832. Thereafter, the Z-value and stencil test is performed in operation 834.

Thereafter, it is determined in decision 836 whether any pixels were altered by the fine rasterizer, color/shading module, etc. If not, the in-use variable is decremented and stored in the hash table in operation 838 using hash address 840. If so, the altered pixels are written to the frame buffer in operation 842. Then, the in-use variable is decremented and stored in the hash table in operation 844 using hash address 846.

The alternate implementation naturally handles primitive Z-value direction changes and possible stencil updates. The interlock prevents early Z-value reading/culling when possible updates to that pixel are active in the pipeline. Likewise, no early stencil reading/culling is performed when possible updates dependent on stencil test are active in the pipeline.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for early Z-value culling prior to pixel rendering in a graphics pipeline, comprising:
   conditionally performing Z-value culling on at least one pixel, where the Z-value culling includes reading a stored Z-value associated with the at least one pixel, and performing a test to determine whether the stored Z-value is in front of a primitive Z-value; and
   conditionally rendering the at least one pixel after performing the Z-value culling;
   wherein whether the at least one pixel is rendered is conditioned on results of the test of the Z-value culling;
   wherein the Z-value culling is conditionally performed on the at least one pixel based on at least one parameter associated with an application program interface.

2. The method as recited in claim 1, and further comprising identifying the at least one pixel with a coarse rasterizer prior to performing the Z-value culling.

3. The method as recited in claim 1, wherein the stored Z-value is read from memory.

4. The method as recited in claim 3, wherein the memory is selected from the group consisting of a register, cache, and a frame buffer.

5. The method as recited in claim 3, wherein stored Z-values in the memory have a hierarchical structure.

6. The method as recited in claim 1, wherein the primitive Z-value at the at least one pixel is calculated based on Z-values of vertexes of the primitive.

7. The method as recited in claim 1, wherein the primitive Z-value at the at least one pixel is determined by calculating a nearest Z-value for a group of pixels of the primitive.

8. The method as recited in claim 1, wherein the primitive Z-value at the at least one pixel is determined by using a Z-value for a vertex of the primitive that is nearest to an eyepoint.

9. The method as recited in claim 1, wherein the primitive Z-value at the at least one pixel is determined by using a limit associated with a group of pixels of the primitive.

10. The method as recited in claim 1, wherein the stored Z-value is at least one of approximate and out-of-date.

11. The method as recited in claim 1, wherein upon the direction of the primitive Z-comparison changing, the Z-value culling is suspended.

12. The method as recited in claim 11, wherein the Z-value culling is suspended until pixels preceding the comparison direction change have been processed in the graphics pipeline and have been stored in memory.

13. The method as recited in claim 12, wherein whether the pixels preceding the comparison direction change have been processed in the graphics pipeline is determined by injecting a token in the graphics pipeline after the pixels preceding the comparison direction change, and resuming Z-value culling upon the token indicating that the preceding pixels have been stored in the memory.

14. The method as recited in claim 12, wherein whether the pixels preceding the comparison direction change have been processed in the graphics pipeline is determined by starting a timer, and resuming Z-value culling after a predetermined amount of time, thus indicating that the preceding pixels have been stored in the memory.

15. The method as recited in claim 12, wherein whether the pixels preceding the comparison direction change have been processed in the graphics pipeline is determined by identifying a number of pixels that have been processed, and resuming Z-value culling after a predetermined number of pixels have been processed, thus indicating that the preceding pixels have been stored in the memory.

16. The method as recited in claim 1, and further comprising determining whether the stored Z-value has changed since performing Z-value culling before rendering the at least one pixel, maintaining the stored Z-value in the graphics pipeline if it is determined that the stored Z-value has not changed, and reading the stored Z-value again if it is determined that the stored Z-value may have changed, wherein the read Z-value is used for a Z-test.

17. The method as recited in claim 16, wherein the determination as to whether the stored Z-value has changed since performing Z-value culling before rendering the at least one pixel is accomplished using pixel reference count.

18. The method as recited in claim 16, wherein the determination as to whether the stored Z-value has changed since performing Z-value culling before rendering the at least one pixel is accomplished using a timestamp associated with reading and writing the stored Z-value.

19. The method as recited in claim 16, wherein the determination as to whether the stored Z-value has changed since performing Z-value culling before rendering the at least one pixel is accomplished using access sequence numbers associated with reading and writing the stored Z-value.

20. The method as recited in claim 16, wherein the determination as to whether the stored Z-value will be updated between Z-value culling and the final Z test is accomplished using pixel reference counts which keep track of which pixel coordinates are currently in the graphics pipeline.

21. A computer program embodied on a computer readable medium for early Z-value culling prior to pixel rendering in a graphics pipeline, comprising:
   (a) a code segment for conditionally performing Z-value culling on at least one pixel, where the Z-value culling includes reading a stored Z-value associated with the at least one pixel, and performing a test to determine whether the stored Z-value is in front of a primitive Z-value; and
   (b) a code segment for conditionally rendering the at least one pixel after performing the Z-value culling;
   (c) wherein whether the at least one pixel is rendered is conditioned on results of the test of the Z-value culling;
   (d) wherein the Z-value culling is conditionally performed on the at least one pixel based on at least one parameter associated with an application program interface.

22. The computer program as recited in claim 21, and further comprising a code segment for identifying the at least one pixel with a coarse rasterizer prior to performing the Z-value culling.

23. The computer program as recited in claim 21, wherein the stored Z-value is read from memory.

24. The computer program as recited in claim 23, wherein the memory is selected from the group consisting of a register, cache, and a frame buffer.

25. The computer program as recited in claim 23, wherein stored Z-values in the memory have a hierarchical structure.

26. The computer program as recited in claim 21, wherein the primitive Z-value at the at least one pixel is calculated based on Z-values of vertexes of the primitive.

27. The computer program as recited in claim 21, wherein the primitive Z-value at the at least one pixel is determined by calculating a nearest Z-value for a group of pixels of the primitive.

28. The computer program as recited in claim 21, wherein the primitive Z-value at the at least one pixel is determined by using a Z-value for a vertex of the primitive that is nearest to an eyepoint.

29. The computer program as recited in claim 21, wherein the primitive Z-value at the at least one pixel is determined by using a limit associated with a group of pixels of the primitive.

30. The computer program as recited in claim 21, wherein the stored Z-value is at least one of approximate and out-of-date.

31. The computer program as recited in claim 21, wherein upon the direction of the primitive Z-comparison changing, the Z-value culling is suspended.

32. The computer program as recited in claim 31, wherein the Z-value culling is suspended until pixels preceding the comparison direction change have been processed in the graphics pipeline and have been stored in memory.

33. The computer program as recited in claim 32, wherein whether the pixels preceding the comparison direction change have been processed in the graphics pipeline is determined by injecting a token in the graphics pipeline after the pixels preceding the comparison direction change, and resuming Z-value culling upon the token indicating that the preceding pixels have been stored in the memory.

34. The computer program as recited in claim 32, wherein whether the pixels preceding the comparison direction change have been processed in the graphics pipeline is determined by starting a timer, and resuming Z-value culling after a predetermined amount of time, thus indicating that the preceding pixels have been stored in the memory.

35. The computer program as recited in claim 32, wherein whether the pixels preceding the comparison direction change have been processed in the graphics pipeline is determined by identifying a number of pixels that have been processed, and resuming Z-value culling after a predetermined number of pixels have been processed, thus indicating that the preceding pixels have been stored in the memory.

36. The computer program as recited in claim 21, and further comprising a code segment for determining whether the stored Z-value has changed since performing Z-value culling before rendering the at least one pixel, a code segment for maintaining the stored Z-value in the graphics pipeline if it is determined that the stored Z-value has not changed, and a code segment for reading the stored Z-value again if it is determined that the stored Z-value may have changed, wherein the read Z-value is used for a Z-test.

37. The computer program as recited in claim 36, wherein the determination as to whether the stored Z-value has changed since performing Z-value culling before rendering the at least one pixel is accomplished using pixel reference count.

38. The computer program as recited in claim 36, wherein the determination as to whether the stored Z-value has changed since performing Z-value culling before rendering the at least one pixel is accomplished using a timestamp associated with reading and writing the stored Z-value.

39. The computer program as recited in claim 36, wherein the determination as to whether the stored Z-value has changed since performing Z-value culling before rendering the at least one pixel is accomplished using access sequence numbers associated with reading and writing the stored Z-value.

40. The computer program as recited in claim 36, wherein the determination as to whether the stored Z-value will be updated between Z-value culling and the final Z test is accomplished using pixel reference counts which keep track of which pixel coordinates are currently in the graphics pipeline.

41. A system for early Z-value culling prior to pixel rendering in a graphics pipeline, comprising:
  (a) a Z-value culling module for conditionally performing Z-value culling on at least one pixel, where the Z-value culling includes reading a stored Z-value associated with the at least one pixel, and performing a test to determine whether the stored Z-value is in front of a primitive Z-value, wherein whether the at least one pixel is rendered is conditioned on results of the test; and
  (b) a rasterizer coupled to the Z-value culling module for conditionally identifying the at least one pixel after performing the Z-value culling;
  (c) wherein whether the at least one pixel is rendered is conditioned on results of the test of the Z-value culling;
  (d) wherein the Z-value culling is conditionally performed on the at least one pixel based on at least one parameter associated with an application program interface.

42. A method for early stencil culling prior to pixel rendering in a graphics pipeline, comprising:
  (a) performing stencil culling on at least one pixel;
  (b) conditionally rendering the at least one pixel after performing the stencil culling; and
  (c) wherein whether the at least one pixel is rendered is conditioned on results of the stencil culling.

43. The method as recited in claim 42, and further comprising identifying the at least one pixel with a coarse rasterizer prior to performing the stencil culling.

44. The method as recited in claim 42, wherein the stencil culling includes reading a stencil value associated with the at least one pixel, and comparing the read stencil value with a stencil reference value, wherein whether the at least one pixel is rendered is conditioned on results of the comparison.

45. The method as recited in claim 44, wherein the stencil value is read from memory.

46. The method as recited in claim 45, wherein the memory is selected from the group consisting of a register, cache, and a frame buffer.

47. The method as recited in claim 45, wherein the pixels that pass the comparison test are rendered.

48. The method as recited in claim 42, wherein the stencil culling is suspended when a drawing mode permits a stencil value update, and ascertaining when pixels rendered using the drawing mode have completed processing by injecting a token in the graphics pipeline after the cessation of the drawing mode, and resuming stencil culling upon the token indicating that the preceding pixels have been stored in the memory.

49. A computer program embodied on a computer readable medium for early stencil culling prior to pixel rendering in a graphics pipeline, comprising:
  (a) a code segment for performing stencil culling on at least one pixel;
  (b) a code segment for conditionally rendering the at least one pixel after performing the stencil culling; and
  (c) wherein whether the at least one pixel is rendered is conditioned on results of the stencil culling.

50. A system for early stencil culling prior to pixel rendering in a graphics pipeline, comprising:
  (a) a stencil culling module for performing stencil culling on at least one pixel;
  (b) a rasterizer coupled to the stencil culling module for conditionally identifying the at least one pixel after performing the stencil culling; and (c) wherein whether the at least one pixel is rendered is conditioned on results of the stencil culling.

51. The method as recited in claim 1, wherein the Z-value culling is conditionally performed on the at least one pixel based on predetermined criteria.

52. The method as recited in claim 51, wherein the predetermined criteria involves a direction of the primitive Z-comparison.

53. The method as recited in claim 51, wherein the predetermined criteria involves a plurality of parameters associated with the application program interface.

54. The method as recited in claim 53, wherein the parameters include a state bundle bit.

55. The method as recited in claim 53, wherein the parameters include a depth test enable bit.

56. The computer program as recited in claim 49, wherein the at least one pixel is identified with a coarse rasterizer prior to performing the stencil culling.

57. The computer program as recited in claim 49, wherein the stencil culling includes reading a stencil value associated with the at least one pixel, and comparing the read stencil value with a stencil reference value, wherein whether the at least one pixel is rendered is conditioned on results of the comparison.

58. The computer program as recited in claim 57, wherein the stencil value is read from memory.

59. The computer program as recited in claim 57, wherein the memory is selected from the group consisting of a register, cache, and a frame buffer.

60. The computer program as recited in claim 57, wherein the pixels that pass the comparison test are rendered.

61. The computer program as recited in claim 49, wherein the stencil culling is suspended when a drawing mode permits a stencil value update.

62. The system as recited in claim 50, wherein the at least one pixel is identified with a coarse rasterizer prior to performing the stencil culling.

63. The system as recited in claim 50, wherein the stencil culling includes reading a stencil value associated with the at least one pixel, and comparing the read stencil value with a stencil reference value, wherein whether the at least one pixel is rendered is conditioned on results of the comparison.

64. The system as recited in claim 63, wherein the stencil value is read from memory.

65. The system as recited in claim 64, wherein the memory is selected from the group consisting of a register, cache, and a frame buffer.

66. The system as recited in claim 64, wherein the pixels that pass the comparison test are rendered.

67. The system as recited in claim 50, wherein the stencil culling is suspended when a drawing mode permits a stencil value update.

\* \* \* \* \*